United States Patent [19]

Charbonneau

[11] 4,024,108
[45] May 17, 1977

[54] ALKYLENE-LINKED AROMATIC POLYIMIDES

[75] Inventor: Larry F. Charbonneau, Rochester, Mich.

[73] Assignee: General Motors Corporation, Detroit, Mich.

[22] Filed: Sept. 22, 1975

[21] Appl. No.: 615,588

[52] U.S. Cl. .............................. 260/47 CP; 264/49; 264/63 R; 264/78 TF
[51] Int. Cl.$^2$ ........................................ C06G 73/10
[58] Field of Search ...... 260/47 CP, 65, 49, 78 TF, 260/63 R, 346.3

[56] References Cited
UNITED STATES PATENTS

| | | | |
|---|---|---|---|
| 3,649,601 | 3/1972 | Critchley et al. | 260/78 TF |
| 3,705,869 | 12/1972 | Darmory et al. | 270/30.2 R |
| 3,705,870 | 12/1972 | Darmory et al. | 260/30.2 R |

*Primary Examiner*—Lester L. Lee
*Attorney, Agent, or Firm*—Jack I. Pulley

[57] ABSTRACT

In accordance with a preferred embodiment of this invention, a family of alkylene-linked aromatic polyimides is synthesized. These polymers are thermally stable at a temperature of at least 400° C. and processible in conventional thermoplastic processing equipment. Such new and useful polymers are produced by employing an alkylene-linked dixylene which is oxidized and dehydrated to form the corresponding dianhydride. This alkylene-linked dianhydride is then reacted, through a condensation polymerization reaction, with any of many known diamine terminated compounds to form the subject polyimide resins.

3 Claims, 7 Drawing Figures

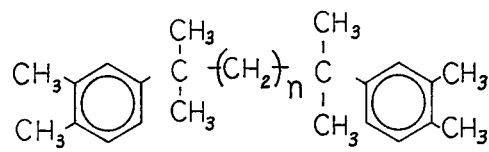
WHEREIN n MAY VARY FROM 3 TO 18
FORMULA I
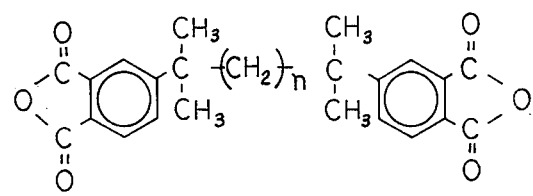
WHEREIN n MAY VARY FROM 3 TO 18
FORMULA II
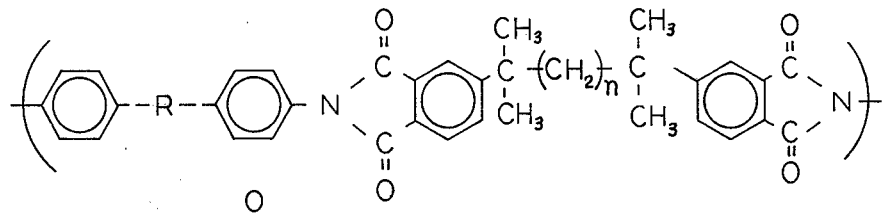
WHEREIN R IS $-\overset{O}{\underset{\|}{C}}-$, $-O-$, OR A LOWER ALKYL $(C_1$ TO $C_4)$
FORMULA III
PREFERRED EMBODIMENT

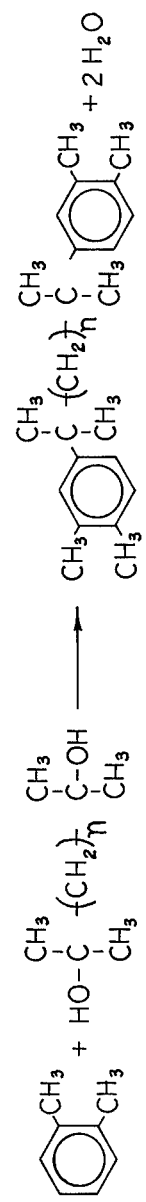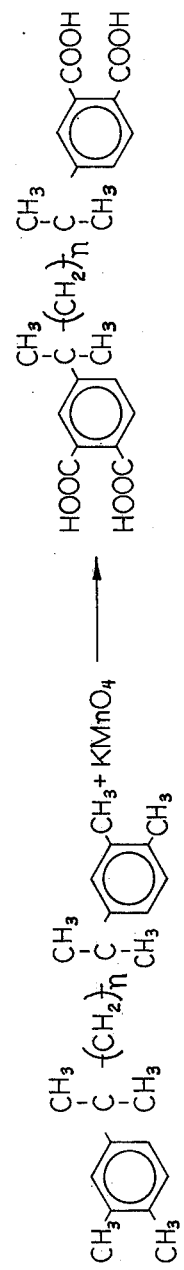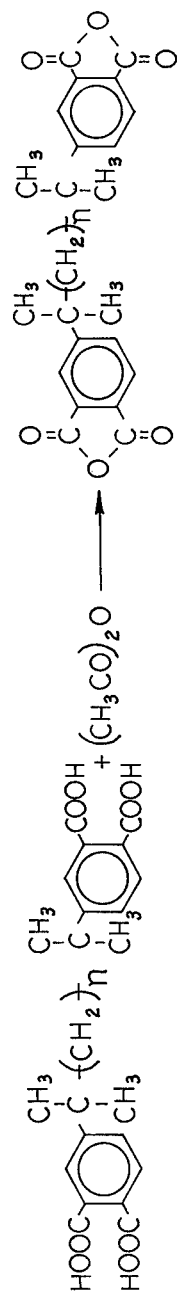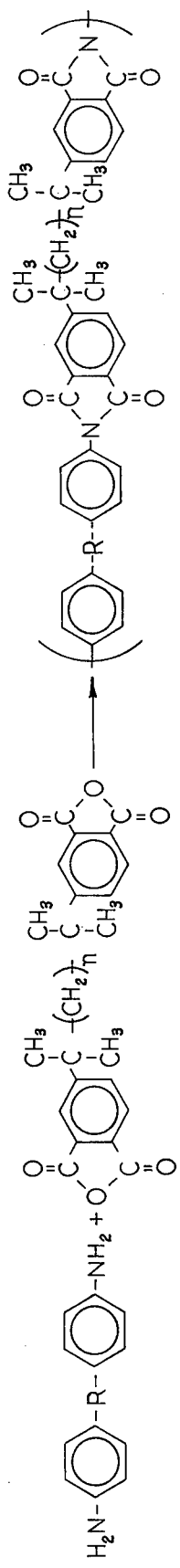
REACTION A
REACTION B
REACTION C
REACTION D

ALKYLENE-LINKED AROMATIC POLYIMIDES

FIELD OF THE INVENTION

This invention is concerned with thermoplastic aromatic polyimide resins and methods of synthesizing same.

BACKGROUND OF THE INVENTION

There is an ever increasing demand for easily processed thermoplastic resins which are thermally stable at higher and higher temperatures. Recent developments have produced many heavily aromatic polymers typically polyimides, having the desired thermostability, but lacking the desired processibility.

The difficulty of processing prior art polyimides is exemplified by the roundabout techniques which have been developed. For example, pyromellitimide is typically processed to the desired physical shape as a polyamic acid, an intermediate chemical form, and then heated to form the more stable imide linkage. Several other techniques specifically designed to avoid thermoforming polyimide resins are also being used.

One key in developing a melt processible material is maintaining adequate flexibility along the polymer backbone. In the subject polyimides, an alkylene linkage between the imide groups is provided which is believed to provide this flexibility. In general, polyimide resins, which are typically the condensation polymerization reaction product of a dianhydride and a dianiline, are likely candidates in the development of thermally stable resins, and limited success has been achieved in this area prior to this invention. For example, as reported in U.S. Pat. No. 3,832,322, aromatic fluoro-alkylene-linked polyimides compounds have been synthesized. While these compounds may have many of the desired properties, their cost is relatively high.

The efforts which produced the subject invention were directed toward the general goal of synthesizing novel polyimide resins which would be serviceable in high temperature environments and easily processed. Therefore, it is an object of this invention to provide aromatic alkylene-linked polyimide which are thermally stable up to temperatures of at least about 400° C. and processible in conventional thermoplastic equipment. In addition, a fire resistant or at least a slow burning resin was desired.

It is a broader object of this invention to provide an alkylene-linked thermoplastic polyimide resin wherein the repeating mer unit has the following structural formula:

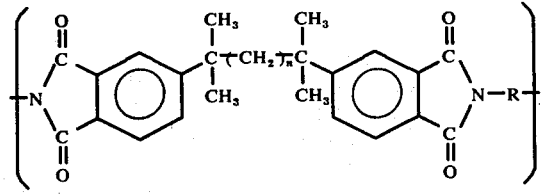

wherein $n$ may vary from 3 to 18 and R is a divalent organic radical selected from the class consisting of (a) aromatic hydrocarbon radicals having from about 6 to about 20 carbon atoms and halogenated derivatives thereof, (b) alkylene radicals having from about 1 to 20 carbon atoms, (c) oxyalkylene radicals having from about 1 to about 100 carbon atoms, and (d) divalent hydrocarbon radicals having the following formula:

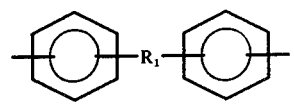

wherein $R_1$ is selected from the group consisting of

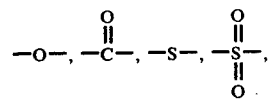

or an alkylene group having up to 15 carbon atoms.

In the following description of the subject invention, frequent reference will be made to the attached sheet of structural formulae and reactions in which:

Formula I depicts alkylene-linked dixylyl compounds suitable for use in the preparations of the subject polyimides.

Formula II depicts suitable alkylene-linked aromatic dianhydride compounds for use in the preparations of the subject polyimides.

Formula III depicts the preferred repeating unit in the subject alkylene-linked aromatic polyimides.

Reaction A depicts the Friedel-Crafts type reaction which produces the subject dixylyl compound shown in Formula I.

Reaction B depicts the oxidation reaction which transforms the dixylyl compound of Formula I into the corresponding tetracarboxylic acid.

Reaction C depicts the dehydration of the tetracarboxylic acid produced in Reaction B to form the alkylene-linked dianhydride compound of Formula II, and Reaction D depicts the subject condensation type polymerization reaction in which the subject dianhydride is reacted with a dianiline compound to form the preferred aromatic alkylene-linked polyimide.

SUMMARY OF THE INVENTION

In accordance with a preferred embodiment of this invention, an alkylene-linked aromatic polyimide is synthesized by a condensation type polymerization reaction of a diamine terminated compound, such as 4,4'-methylenedianiline, and an alkylene-linked aromatic dianhydride, such as 2,7-bis-(3,4-dicarboxyphenyl anhydride) 2,7-dimethyloctane, as shown in Reaction D (when $n$ is 4 and R is —$CH_2$—). Generally, the diamine compounds are commercially available, but the alkylene-linked aromatic dianhydride compounds are produced by first reacting o-xylene and an aliphatic ditertiary alcohol, such as 2,7-dimethyl-2,7 octanediol, to produce an alkylene-linked dixylene, such as 2,7-bis-(3,4-dicarboxyphenyl)-2,7-dimethyloctane which is, in turn, oxidized to a tetracarboxylic acid and then dehydrated to form the subject alkylene-linked aromatic dianhydride. This reaction scheme may be used to produce any of the alkylene-linked dianhydride compounds as described in Formula II wherein n may vary from 3 to 18. It is noted that the benzylic methyl groups have been substituted for the oxidatively unstable benzylic protons to prevent cleavage at this point during the subsequent oxidation reaction to form the dianhydride. During the polymerization reaction, the amine and the anhydride combine to form the imide linkage and split off water.

The efforts which led to the subject invention were directed toward synthesizing an alkylene-linked aromatic dianhydride compound which would react with typical diamine terminated compounds to form the desired alkylene-linked aromatic polyimide. This was a major objective because it was believed that the alkylene linkage would provide considerably more flexibility in the polymer backbone at a lower cost than the prior art linkages which included —O—, —S—, —CO—, —SO$_2$—, —CH$_2$—, or —(CF$_2$)$_n$—, as taught in the aforementioned 3,832,322 patent. In U.S. Pat. No. 2,712,543

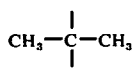

is also disclosed as a suitable linkage.

The polyimide resins produced in accordance with the subject invention exhibit an extraordinary thermal stability and a relatively low glass transition temperature. For example, Polyimide III which has a non-weighted peak molecular weight of about 40,000 and which is depicted in Formula III wherein n is 8 and R is —O—, is stable in air at about 400° C. Furthermore, this resin does not thermally degrade to the point where it has lost 50% of its weight until it is heated in air to about 560° C., at a rate of about 10° C. per minute. In addition, the glass transition temperature of this resin is only 122.3° C., which indicates a resin which is readily melt processed by techniques such as injection or compression molding, fiber spinning, etc.

These and other advantages and objects of the subject invention will be more easily understood in view of a detailed description thereof to include specific examples.

DETAILED DESCRIPTION OF THE INVENTION

The first step in the synthesis of the desired alkylene-linked aromatic dianhydride compound is to react o-xylene with a suitable alkylene-linked ditertiary alcohol. This is a Friedel-Crafts type reaction which couples the alcohol directly to the aromatic ring and splits off water.

In this type of reaction, which is more generally termed an electrophilic aromatic substitution, a metal halide or acid catalyst apparently activates the ditertiary alcohol which, in turn, reacts with, and covalently bonds to, the aromatic ring of the first reactant, o-xylene; during this reaction water is split off. In the practice of this invention any of the typical metal halide or acid catalysts may be used including: aluminum chloride (AlCl$_3$), hydrofluoric acid (HF), stannous chloride (SnCl$_4$), Boron trifluoride (BF$_3$) and preferably, ferric chloride (FeCl$_3$). All of the aforementioned catalysts have been tried, however the ferric chloride catalyzed reaction provides a yield of about 64 percent. It is believed that the relative mildness of the ferric chloride (FeCl$_3$) promotes the increased yield by minimizing the yield of competing reactions. It is to be noted that two of the electrophilic aromatic substitutions must occur to form one molecule of the desired alkylene-linked dixylene.

It has been found that the highest yield from this reaction is produced if the ditertiary alcohol is added to a mixture of the catalyst and the o-xylene at about 0° C.

In this method, the excess of o-xylene and the catalyst act as the reacting medium. This reaction also may be carried out in a suitable solvent medium such as methylene chloride or nitrobenzene. It is to be noted that a ditertiary halide may be substituted for the ditertiary alcohol in the alkylation of the o-xylene compounds. The product of the above reaction is an alkylene-linked dixylene (see Formula I) which is then oxidized to the corresponding tetracarboxylic acid. Typically, this well-known reaction may be carried out by adding potassium permanganate (KMnO$_4$) to the dixylene in the presence of pyridine and water.

After the tetracarboxylic acid is produced and purified it is dehydrated by the addition of acetic anhydride at about 120° C. The product of this reaction is the desired anhydride shown in Formula II which can be reacted with any of a number of suitable diamine or dianiline compounds to form the subject polyimide resin. Suitable diamines include but are not limited to: m-phenylenediamine, o-phenylenediamine, benzidine, 3,3'-dimethylbenzidiene, m-xylylenediamine, p-xylylenediamine, bis-(para, beta amino-t-butyl phenyl)ether, 4,4'-diaminodiphenyl ether, 1,5-diaminonaphthalene, 4,4'-diaminodiphenyl sulfide, 4,4'-diaminodiphenyl methane, 4,4'-diaminodiphenyl propane, and the like. Generally, suitable diamine compounds are described by the following formula:

wherein R$_2$ is a divalent organic radical selected from the class consisting of (a) aromatic hydrocarbon radicals having from about 6 to about 20 carbon atoms and halogenated derivatives thereof, (b) alkylene radicals having from about 1 to 20 carbon atoms, (c) oxyalkylene radicals having from about 1 to 20 carbon atoms, and (d) divalent hydrocarbon radicals having the following formula:

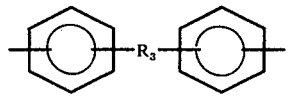

wherein R$_3$ is selected from the group consisting of

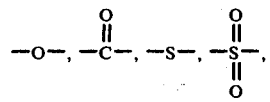

or an alkylene group having up to 15 carbon atoms.

In the table below, the physical properties of three representative polyimide resins are listed along with the IUPAC names under the general terms polyimide I, II, and III. In addition, the variables n and R in Formula III are specified for each resin; this, of course, provides the appropriate chemical structures. Each of the three resins characterized in the table had a peak molecular weight of between 40,000 and 45,000, as tested on a gel permeation chromatograph (hereinafter GPC) using polystyrene as the reference. The peak molecular weight is a non-weighted value which is essentially the molecular weight of the most plentiful polymer species in the samples. In other words, the peak molecular weight is the molecular weight at the top (or peak) of the GPC curve. The polymer samples prepared in accordance with this invention have produced substantially bell-shaped GPC curves.

In addition to the thermal stability and glass transition figures in Table I, the oxygen index is also noteworthy. This relatively high value indicates that the subject polyimides are fire resistant, a property which should make these resins attractive in many applications.

lized from this solution; the overall yield was about 64% and the crystals melted at about 69° C.

To oxidize the dixylyl compound prepared in the preceding step and thereby form the corresponding tetracarboxylic acid, a mixture of 400 ml of pyridine and 110 ml of water were placed in a 1 liter kettle and heated along with 35 grams of the dixylyl compound. Potassium permanganate (190 g) was slowly added to the refluxing and well stirred solution; additional time

TABLE I

| Number | IUPAC Name | In Formula III | |
|---|---|---|---|
| Polyimide I | Poly[(1,3-dioxoisoindoline-2,5-diyl)-1,1,6,6-tetramethylhexamethylene-(1,3-dioxoisoindoline-5,2-diyl)-p-phenylenemethylene-p-phenylene] | $n=4$ $R=-CH_2-$ | |
| Polyimide II | Poly[(1,3-dioxoisoindoline-2,5-diyl)-1,1,6,6-tetramethylhexamethylene-(1,3-dioxoisoindoline-5,2-diyl)-p-phenyleneoxy-p-phenylene] | $n=4$ $R=-O-$ | |
| Polyimide III | Poly[1,3-dioxoisoindoline-2,5-diyl)-1,1,10,10-tetramethyldecamethylene-(1,3-dioxoisoindoline-5,2-diyl)-p-phenyleneoxy-p-phenylene] | $n=8$ $R=-O-$ | |
| PROPERTIES OF ALKYLENE-LINKED AROMATIC POLYIMIDES | | | |
| Property | Polyimide I | Polyimide II | Polyimide III |
| Thermal Stability measured by Thermal Gravimetric analysis, programmed at 10° C. min$^{-1}$ | $T_d^{50}$ in air: 565° C. in nitrogen: 505° C. | $T_d^{50}$ in air: 555° C. in nitrogen: 510° C. | $T_d^{50}$ in air: 560° C. in nitrogen: 495° C. |
| Thermomechanical Analysis (TMA) Vicat Softening Temperature, measured by TMA | 160° C. | — | — |
| Glass Transition Temperature, by Differential Scanning Calorimetry at 5° C. min$^{-1}$ | 160° C. | 167° C. | 122° C. |
| A Transition observed by Torsional Braid Analysis at about 1 Hz. | 170° C. | 170° C. | 130° C. |
| Coefficient of Thermal Expansion | about $3 \times 10^{-5}$ deg$^{-1}$ | — | — |
| Specific Heat of Combustion | 7.97 kcal g$^{-1}$ | 7.64 kcal g$^{-1}$ | 7.94 kcal g$^{-1}$ |
| Density | 1.19 g/cc | 1.20 g/cc | 1.05 g/cc |
| Oxygen Index ASTM D28-63 | — | 27.8 | — |

EXAMPLE I

Herein, the synthesis of certain polymers in the subject polyimide class of resins will be detailed.

The solvents used in the following synthesis were purified as follows. The diethyl ether and the tetrahydrofuran (hereinafter THF) were distilled from about 0.2 N n-propylmagnesium bromide to remove water and other active hydrogen containing impurities. The benzene used herein was distilled from n-butyllithium to remove acidic impurities. The dimethylsulfoxide (DMSO) was dried with 4 A molecular sieve and then distilled from dimsyl ion.

To prepare the compound described in Formula I wherein n is 4 (i.e., 2,7-bis-(3,4-dimethylphenyl)-2,7-dimethyloctane,) a 1 liter resin kettle was fitted with a stirrer, a condenser, and a solids addition flask. The kettle was cooled to 0° C. and 500 grams of o-xylene were added. To this, 200 grams of ferric chloride (FeCl$_3$) were added over a 30 minute period and then a slush of 30 grams of 2,7-dimethyl-2,7-octanediol and 50 ml of o-xylene were added over a 2 hour period while the reaction temperature was maintained at 0° C. After stirring for an additional 4 hours, the mixture was allowed to warm to room temperature, and was then poured onto ice. After separating the organic and aqueous layers, the organic layer was washed with water, and the solvent was removed from the organic layer. The crude black solid product was dissolved in boiling 95% ethanol and repeatedly passed through a pad of activated charcoal and Fuller's earth until a colorless solution was obtained. The product was then crystalwas about 1 hour. After refluxing for an additional 4 hours, a negative test for permanganate was obtained and the hot mixture was filtered to remove manganese dioxide (MnO$_2$). The MnO$_2$ was washed several times with boiling water, then the filtrate was concentrated and the pyridine was removed on a rotary evaporator. The concentrated basic solution was acidified to pH 1.0 with 3N HCl to precipitate a crude product. After filtering, the product was dissolved in 95% ethanol and placed on a strong acid cation exchange column to remove potassium. The tetra-acid was eluted from the column with 95% ethanol. The yield was about 50%.

The tetracarboxylic acid prepared above was then dehydrated to form the corresponding dianhydride by placing one mole of the acid in a flask with a 4 mole excess of acetic anhydride. Acetic acid was then distilled from this mixture. The hot mixture was then poured into a crystallizing dish to precipitate dianhydride. Crystals were collected in a sintered glass funnel and washed with dry ether to remove acetic anhydride. The product was then dissolved in benzene, filtered under an argon atmosphere and then precipitated by adding diethyl ether. The solvents were removed under argon pressure and the crystals were washed with diethyl ether and dried under vacuum.

The polyimide as described in Formula III, wherein n is 4 and R is —CH$_2$—, was prepared in a 500 ml flask containing 250 ml of THF. To this solvent, 5.051 grams of the dianhydride and 2.305 grams of 4,4'-methylenedianiline were added. The solution was magnetically stirred at room temperature for 16 hours. The solvent was then removed under reduced pressure on a rotary evaporator. The contents of the flask at a pressure of 0.1 mm of Hg were then heated to 200° C. to form the subject polyimide. This particular polyimide is physically characterized above in Table I under the designation Polyimide I. This polymer had a peak molecular weight of about 45,000 as determined by gel permeation chromatography. This is not an average value but rather the molecular weight at the top of the GPC curve which in this case was substantially bell-shaped. This resin was then fractionated and an upper fraction had a weight average molecular weight ($\overline{M}_w$) of 182,000 as measured by conventional light scattering techniques. In addition, this fraction had a number average molecular weight of 71,250 as measured by membrane osmometry.

In accordance with the procedures described above, and using the dianhydride of Example I, a polyimide as depicted in Formula III wherein $n$ is 4 and R is —O— was synthesized. This polyimide is the condensation polymerization reaction product of the dianhydride of Example I and oxydianiline, (4,4'-diaminodiphenyl ether), and the physical properties of this resin are reported in Table I under the designation polyimide II.

Similarly, Polyimide III as depicted in Formula III wherein $n$ is 8 and R is —O— was synthesized. The dianhydride used to prepare this polyimide was synthesized by oxidizing and dehydrating the dixylyl reaction product of o-xylene and 2,11-dimethyl-2,11-dodecanediol. Polyimide III is also physically characterized in Table I.

EXAMPLE II

An alkylene-linked aromatic polyether-imide was also prepared using the reaction scheme described above. This polymer was synthesized by polymerizing about 3.8 grams of a diamine terminated polypropylene oxide having a molecular weight of about 440 with about 3.72 grams of the alkylene linked dianhydride depicted in Formula II wherein $n$ is 4. The polypropylene oxide is marketed by the Dow Chemical Company under the designation SA 1990. The resulting polymer had a peak molecular weight on a gel permeation chromatograph curve of about 24,000.

While our invention has been described in terms of certain specific embodiments, it will be appreciated that other forms thereof could readily be adapted by one skilled in the art. Therefore, the scope of our invention is not to be limited to the specific embodiments disclosed.

I claim:

1. A thermally stable and melt processable alkylene-linked polyimide resin consisting essentially of repeating mer units of the following structural formula:

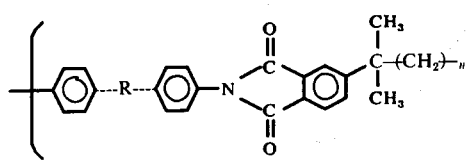

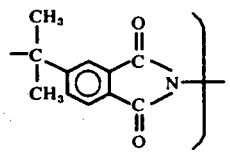

wherein R is oxygen, carbonyl, or a divalent alkylene group having from 1 to 4 carbon atoms and $n$ may vary from 3 to 18, or R may be absent.

2. A thermally stable and melt processable alkylene-linked polyimide resin consisting essentially of repeating mer units of the following structural formula:

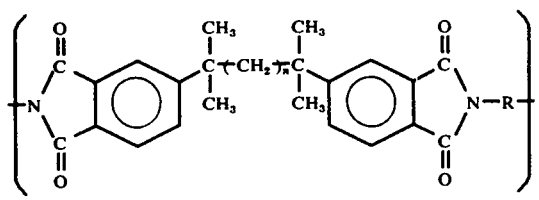

wherein $n$ may vary from 3 to 18 and R is a divalent organic radical selected from the class consisting of (a) aromatic hydrocarbon radicals having from about 6 to about 20 carbon atoms and halogenated derivatives thereof, (b) alkylene radicals having from about 1 to 20 carbon atoms, (c) oxyalkylene radicals having from about 1 to about 100 carbon atoms, and (d) radicals having the following formula:

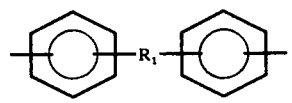

wherein $R_1$ is selected from the group consisting of

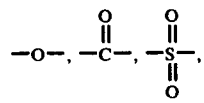

or an alkylene group having up to 15 carbon atoms.

3. A thermally stable and melt processable alkylene-linked polyimide resin which is the polymerization reaction product of:
a. an alkylene-linked dianhydride having the following structural formula:

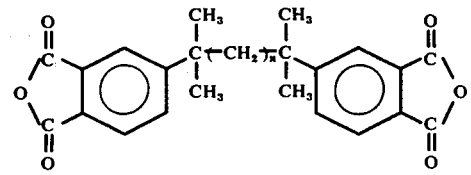

wherein $n$ may vary from 3 to 18; and
b. a diamine

* * * * *